United States Patent
Beranger et al.

(10) Patent No.: US 7,617,722 B2
(45) Date of Patent: Nov. 17, 2009

(54) TIRE, WHEEL OR TIRE AND WHEEL ASSEMBLY EQUIPPED WITH A DEVICE FOR COUNTING THE NUMBER OR ROTATIONS

(75) Inventors: Marc Beranger, Saint-Martin-D'Uriage (FR); Franck Daumas, Nohanent (FR); Franck Liberge, Durtol (FR); Thierry Penot, Clermont-Ferrand (FR); Franck Vial, Paladru (FR); Marie-José Villard, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 204 days.

(21) Appl. No.: 11/700,574

(22) Filed: Jan. 31, 2007

(65) Prior Publication Data
US 2007/0222569 A1    Sep. 27, 2007

(30) Foreign Application Priority Data
Jan. 31, 2006  (FR)  .................................. 06 00872

(51) Int. Cl.
G01M 17/02  (2006.01)
(52) U.S. Cl. ....................................................... 73/146
(58) Field of Classification Search ........ 73/146–146.8; 340/442–447
See application file for complete search history.

(56) References Cited

U.S. PATENT DOCUMENTS

| | | | | |
|---|---|---|---|---|
| 4,570,152 A * | 2/1986 | Melton et al. | ................ | 340/449 |
| 5,541,859 A * | 7/1996 | Inoue et al. | ................. | 702/148 |
| 6,087,930 A | 7/2000 | Kulka et al. | | |
| 6,782,739 B2 * | 8/2004 | Ratti et al. | ..................... | 73/146 |
| 7,360,411 B2 * | 4/2008 | Beranger et al. | .............. | 73/146 |
| 2005/0258950 A1 * | 11/2005 | Sahashi et al. | .............. | 340/444 |
| 2006/0238356 A1 * | 10/2006 | Tucker | ..................... | 340/572.8 |
| 2008/0246467 A1 * | 10/2008 | Vial et al. | .............. | 324/207.25 |

FOREIGN PATENT DOCUMENTS

| EP | 1 207 499 A | 5/2002 |
|---|---|---|
| WO | WO 2004/110793 A | 12/2004 |

* cited by examiner

Primary Examiner—Andre J Allen
Assistant Examiner—Jermaine Jenkins
(74) Attorney, Agent, or Firm—Cohen Pontani Liberman & Pavane LLP

(57) ABSTRACT

In an electronic device for counting the number of rotations for a tire and wheel assembly, a storage means holds counting information (NbRot) intended to represent the number of rotations counted at each moment. The counting information (NbRot) represents the number of rotations counted from a predetermined time.

17 Claims, 3 Drawing Sheets

TIRE, WHEEL OR TIRE AND WHEEL ASSEMBLY EQUIPPED WITH A DEVICE FOR COUNTING THE NUMBER OR ROTATIONS

FIELD OF THE INVENTION

The invention concerns a tire and wheel assembly equipped with an electronic device for counting the number of rotations thereof.

BACKGROUND OF THE INVENTION

At the present time electronic devices for checking mechanical systems are being used more and more frequently, for example in order to obtain monitoring of the functioning thereof.

In this way, devices are used which count the rotations made by an object able to move about an axis, such as a wheel on a vehicle, so that the latter can ensure that the use of the tire carried by the wheel is monitored.

Such a solution is described in the patent application WO 2004/110793.

In such electronic devices, the number of rotations of the object is stored in the form of counting information in the memory of the device.

However practical this may be, this solution bases its check function (that is to say correct monitoring of the mechanical system) on the exactitude of the counting information stored and is therefore vulnerable when there is a risk of this information being altered, for example by a fraudster seeking to reduce (or even to cancel) the number of turns stored by the device.

SUMMARY OF THE INVENTION

In order to address this problem, one embodiment of the invention is directed to a tire, a wheel or a tire and wheel assembly equipped with an electronic device for counting the number of rotations in which a storage means holds counting information intended to represent the number of rotations counted at each moment. A means is provided for ensuring the absence of zeroing of the storage means from a predetermined time and thus ensuring that the counting information represents the number of rotations counted from the predetermined time.

The counting information can thus be used for monitoring the number of rotations since the predetermined time with a better degree of certitude.

The use of the counting information for monitoring the number of rotations since the predetermined time after unwanted zeroing (intentional or not) of the storage means is thus avoided.

Here "zeroing" is meant in the general sense, namely any modification to a prior value of the information stored, even if this value is not zero.

According to a first embodiment, the means for ensuring the absence of zeroing comprise means of conditional zeroing of the storage means.

Unwanted zeroings are thus avoided, the use of an authorized zeroing requiring a particular context (i.e. at least one particular condition).

The means of conditional zeroing are for example able to zero the storage means if and only if at least two distinct conditions are fulfilled.

When the device comprises means of receiving a request to send data, a first one of the conditions may consist of the reception of the said request.

When the device comprises a microcircuit, a second one of the conditions may consist of the application of a predetermined voltage on a pin of the microcircuit.

According to a second embodiment, possibly combinable with the first, the means for ensuring the absence of zeroing comprise means of counting the number of zeroings of the storage means.

There is thus access available to the number of unwanted zeroings, a single zeroing generally being authorized during the life of the device.

The counting means are for example able to store the number of zeroings in a non-volatile memory, which makes it possible to preserve this number even in the case of cutting of the power supply to the device.

According to another embodiment, it is possible to ensure that a fusible component of the microcircuit is "blown" at each zeroing, making the device unusable after a defined number of zeroings corresponding to as many fusible components present in the microcircuits; this makes the number of zeroings of the device visible on the device.

When the device comprises data sending means, the sending means are able for example to send information relating to the number of zeroings, which enables this information to be monitored from the outside.

The device can also comprise means of initializing the device able to zero the storage means at the predetermined moment, according to a normal authorized operating procedure.

In this case, the initialization means are for example able to store a predetermined code in a first part of a random access memory, while a second part of the random access memory can form the storage means.

According to a third embodiment, possibly compatible with at least one of the first two, the means for ensuring the absence of zeroing comprise means of checking the presence of the predetermined code in the first part of the random access memory.

It is thus possible to detect unwanted zeroing of the storage means.

Means of sending the counting information are then for example able to send this information only in the case of positive verification by the verification means, which makes it possible to send information only when its reliability is ensured by the verification means.

According to a fourth embodiment, possibly compatible with one or more of the other three, a means of reinforcing the degree of certitude of the counting information consists of allowing a zeroing of the storage means only by means of a specific encrypted request sent by a device external to the electronic device for counting the number of rotations and able to communicate with it. Preferably, the encrypting key of the encrypting algorithm is situated in the external device. This makes it more difficult for a normal user of the vehicles to identify and study it.

In addition, the electronic counting device can encrypt the counting information on the number of rotations with the same encrypting algorithm. It is the external device that, after the sending of a request, receives and processes the counting information on the number of rotations.

Preferentially, the counting device is carried by the tire rather than by the wheel. The number of rotations recorded by the device then irrefutably corresponds to the tire whatever the number of fittings and removals it has undergone.

Another object of the invention is the use, for equipping and characterizing a tire, a wheel or a tire and wheel assembly, of an electronic device for counting the number of rotations of an object in a reference frame, in which a storage means (10)

of the counting device retains counting information (NbRot) intended to represent the number of rotations counted at each moment, the said device being characterized in that the counting device comprises means for ensuring that the counting information (NbRot) represents the number of rotations counted from a predetermined time.

According to another aspect, an object of the invention is an electronic device for counting the number of rotations of an object in a reference frame, comprising a magnetic sensor connected to counting means and means of receiving external signals, wherein the means of receiving external signals include an electromagnetic antenna comprising the magnetic sensor.

Another object of the invention is the use, for equipping and characterizing a tire, a wheel or a tire and wheel assembly, of an electronic device for counting the number of rotations of an object in a reference frame according to the invention as well as a tire, a wheel or a tire and wheel assembly equipped with such a device.

Preferably, the magnetic sensor is a coil.

The magnetic sensor can be connected to the counting means by a low-frequency filter.

The device comprising a microcontroller connected to the counting means, the electromagnetic antenna is connected to the microcontroller by a high-frequency filter.

DETAILED DESCRIPTION OF THE DRAWINGS

Figure 1:
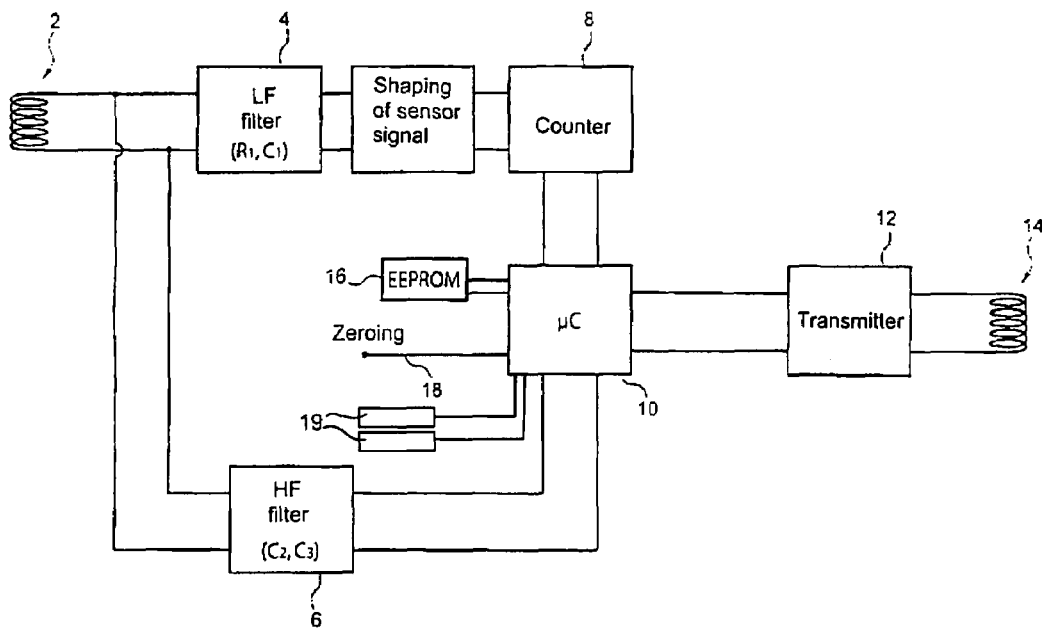
FIG. 1 depicts the general diagram of a counting device according to an embodiment of the invention.

FIG. 1 depicts the essential elements of a device for counting the rotations of an object in a reference frame produced in accordance with the teachings of the invention.

This is for example a self-contained device fitted in a tire for the purpose of counting the number of wheel rotations made by the tire in order to have an indication of its state of wear.

The counting device depicted in FIG. 1 comprises a magnetic sensor 2 implemented in practice by a coil, that is to say a conductive winding formed by one turn or a plurality of turns.

The signal generated by the sensor 2 is transmitted on the one hand to a counter 8, through a low-frequency filter 4 (hereinafter referred to as an LF filter) and then possibly to a signal-shaping circuit, and on the other hand to reception terminals of a microcontroller 10 through a high-frequency filter 6, as described in detail below.

The LF filter 4 is designed to transmit from the magnetic sensor 2 to the counter 8 only the signals representing the movement to be measured (that is to say here the signals generated at the rotation frequency of the object, by the rotation of the magnetic sensor 2 in the earth's magnetic field).

To do this, the LF filter 4 has a high impedance outside the frequency range that corresponds to the measurement signals.

For example, in the case mentioned here of measuring rotations of a tire, in the light of the normal rotation speeds of vehicle wheels, the signals generated by the rotation in the earth's magnetic field have frequencies varying between 1 Hz and a few tens of Hz.

There is therefore provided, in this case, a high impedance of the LF filter 4 starting from a frequency above 100 Hz, for example from 1 kHz.

The function of the counter 8 is to count the number of half cycles in the signal generated in the magnetic sensor 2 because of its rotation in the earth's magnetic field, that is to say in the signal transmitted by the LF filter 4.

The counter 8 counts for example a predetermined number of half cycles (for example 4096 half cycles) in the signal that it receives from the LF filter 4, and then, when the predetermined number is reached, transmits information that this number has been exceeded to a microcontroller 10, and then resumes counting the predetermined number of half cycles.

The microcontroller 10 increments an internal register each time the information on exceeding is received and thus stores the total number of items of information on exceeding received, which therefore represents (to within a multiplication factor) the number of half cycles in the signal issuing from the LF filter 4.

This thus easily gives access to the number of rotations of the counting device (and in an equivalent fashion of the magnetic sensor 2 fixed to it) in the earth's magnetic field.

On this subject reference can be made to the patent application WO 2004/110793, which also describes some of the aspects that have just been mentioned.

As already indicated, the coil 2 is also connected to a high-frequency filter 6 (hereinafter referred to as an HF filter). This HF filter 6 is designed so as to have a high impedance in the frequency ranges of the signals used for the measurement (here for the counting of the rotations), that is to say the signals transmitted from the coil 2 to the counter 8 by the LF filter 4, so that the HF filter 6 transmits from the coil 2 to the reception terminals of the microcontroller 10 only the signals with a frequency above a given frequency (for example around 1 kHz), or in a frequency band whose lower limit corresponds to this given frequency.

The LF filter 4 and the HF filter 6 therefore have distinct bandwidths (for example on each side of 1 kHz), which makes it possible, from the coil 2, to transmit only the signals in a first frequency band to the counter 8 and only the signals in a second frequency band to the reception terminals of the microcontroller 10.

In the second frequency band (situated here above 1 kHz, for example around 50 kHz, with a bandwidth of a few kHz, for example 5 kHz, which corresponds to an overvoltage coefficient of 10), the coil 2 behaves like an electromagnetic antenna.

This thus permits the reception, by the coil 2 and through the HF filter 6, of a radio frequency signal by the microcontroller 10 at its reception terminals.

It is thus possible to transmit information to the counting device (that is to say in practice to its microcontroller 10) by telecommunication by means of electromagnetic waves (for example on a 50 kHz carrier in the example mentioned above).

It is a case in particular of alert information transmitted by an external device (typically a device in the electronic system of the vehicle or other device monitoring the state of wear of the tires); this alert information indicates to the counting device (in practice to its microcontroller 10) that the latter must send information representing the total measured movement (that is to say the number of rotations made) as described below.

To do this, the counting device of FIG. 1 also comprises a transmitter 12 in electrical connection with the microcontroller 10 and a transmission antenna 14, for example implemented in the form of a conductive winding.

Thus, when it receives alert information by means of the coil 2 serving as an electromagnetic reception antenna, but possibly also in other phases of its functioning, the microcontroller 10 transmits to the transmitter 12 information to be sent (such as the total number of items of information on exceeding received, which, as already indicated, represents the number of rotations made by the tire.).

The transmitter 12 then converts this information (for example received by it in the form of a bitstream) into electrical signals to be sent in the form of an electromagnetic wave by the transmission antenna 14, for example on a carrier at a transmission frequency (which is equal to 433.92 MHz in the embodiment described here).

In summary, the microcontroller 10 receives the measurement information generated by the coil 2 at the frequencies where the latter behaves as a magnetic sensor (measurement information processed by the counter 8), and reception information received by the coil 2 in the frequencies where it behaves as an electromagnetic antenna.

The use of the LF filter 4 and of the HF filter 6 makes it possible to limit the transmission of the signals, respectively to the counter and to the reception terminals of the microcontroller 10, solely to the useful frequency ranges in each case, that is to say respectively the frequencies where the measurement signals or information appear (in general below 100 Hz) and the reception frequencies of the radio frequency signals (that is to say typically between 10 kHz and 1 MHz).

By virtue of this construction, the coil 2 fulfils simultaneously the roles of magnetic sensor and electromagnetic antenna, without this however involving any problem for the functioning of the circuit (such as for example any problems of interference between these two functions).

In the counting device of FIG. 1, the microcontroller 10 is also connected to a rewritable non-volatile memory 16 (for example of the EEPROM type, the name coming from the English "*Electrically Erasable and Programmable Read Only Memory*"). This non-volatile memory 16 makes it possible for example to store information relating to the number of zeroings that the counting device has undergone, which constitutes, as explained below, a protective measure against any attempts at fraud on the number of turns counted.

The microcontroller 10 is also connected to fusible components 19, the number of which corresponds to the total number of zeroings authorized for the device before making it unusable.

The zeroing of the number of turns counted is here conditional in order to prevent an unwanted zeroing: the microcontroller 10 initiates a procedure of authorized zeroing of the number of turns counted when the following two conditions are combined:

the presence of an electrical voltage of a predetermined value (for example above 3 V) on a dedicated pin 18 of the microcontroller 10; and reception of alert information by means of the coil 2 and through the HF filter 6 according to the methods already mentioned.

During this authorized zeroing phase, the external device that sends the alert information can also transmit a predetermined number or code that will thus be received by the microcontroller 10 (through the coil 2 and HF filter 6), and then stored by the microcontroller 10 in the memory used for storing the number of turns counted (here the random access memory formed by the internal registers already mentioned).

The microcontroller 10 will then be able to verify the presence of this information in order to check that the content of the memory (which comprises the number of turns counted) has not be reinitialized or corrupted (for example by a fraudster wishing to zero the number of turns counted). Provision can then be made for the microcontroller 10 to trigger the sending of the information to be sent by the transmitter 12 only provided that it previously verifies the presence of the code in the memory.

In practice, the verification of the presence of the code in the memory may for example be achieved by transmitting the code, from the external device, at the same time as the alert information already mentioned; the microcontroller 10 can then compare the code received with each item of alert information with the code stored in memory during the authorized zeroing phase and thus verify that the memory has not suffered any alteration.

When, according to a particular embodiment, the device comprises the fusible components 19, following a zeroing process, the microcircuit applies a predefined voltage at the terminals of the fusible components 19. This voltage blows this fusible component, which makes visible the number of zeroings in the counting device. Moreover, when all the fusible components 19 are blown, the microcircuit 10 becomes unusable.

A description will now be given with reference to FIG. 2 of a possible embodiment for the coil 2, the LF filter 4 and the HF filter 6 that has just been described with reference to FIG. 1.

As will be described below, the first part of the electrical circuit depicted in FIG. 2 makes it possible to form other functions than those that have just been mentioned, and in particular a shaping of the measurement signals, as illustrated in FIG. 1.

Figure 2:
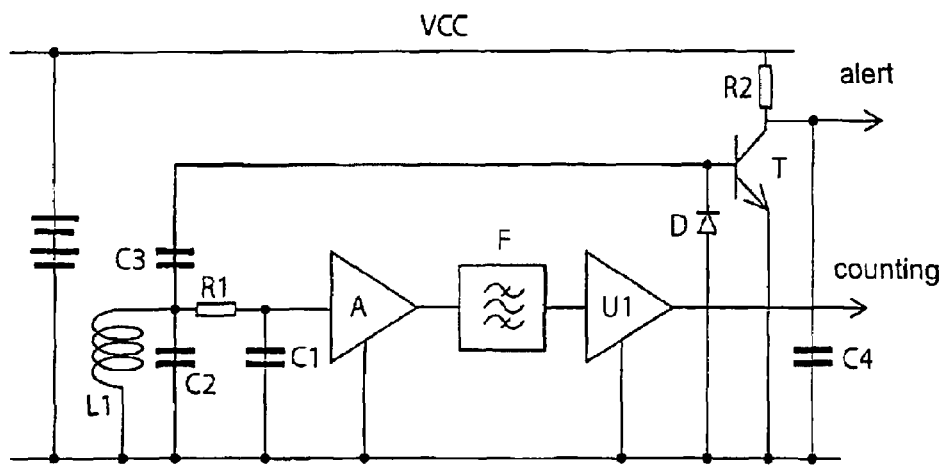
FIG. 2 depicts a detailed example of part of the device of FIG. 1.

The coil 2 is depicted in the electrical diagram in FIG. 2 by an inductor L1.

The coil 2 is implemented by the winding of several thousands of turns (for example between 1,000 and 10,000 turns, here 3,000 turns) each having a surface area of around 10 mm² and produced from insulated copper wire, which confers on it an inductance of a few tens of mH. In this way an equivalent surface area of around a few dm² is obtained, or even a few tens of dm² (for example between 1 dm² and 1 m²).

Advantageously, the turns can be wound on a core with high magnetic permeability, which affords an improvement in the sensitivity that corresponds to a multiplication of the equivalent surface area, for example by a factor of between 1 and 10, here a factor of 6.

This sizing of the coil enables it to constitute at low frequency a magnetic sensor with a sensitivity of around 1 V/tesla at 1 Hz, which thus generates at its terminals a voltage of around 50 µV at 1 Hz during its rotations in the earth's magnetic field (taking for the latter a characteristic value of 50 µT).

The sizing of the coil 2 also enables it, because of its stray capacitance $C_{stray}$, which is equal to approximately 40 pF, to constitute an electromagnetic antenna sensitive in particular around its resonant frequency $$f_0 = \frac{1}{2\pi}\sqrt{L1 \cdot C_{stray}},$$

that is to say here approximately 100 kHz.

As can be seen in FIG. 2, the terminals of the coil 2 (represented by the inductor L1) are for a first part connected by the association in series of a resistor R1 and a capacitor C1 that form a low-pass filter F1 with a cutoff frequency of 9 Hz. This low-pass filter F1 already allows the transmission only of the measurement signals to the subsequent stages of the electronic circuit described below, even if other filters reinforce this effect as also explained below.

This is because, in the application considered here of a measurement of the number of rotations of the heavy wheels (whose maximum speed is around 30 m/s and where the circumference traveled by the sensor is around 3 m), the signals measured are less than 10 Hz.

After filtering by the low-pass filter F1, the signals (at the terminals of the capacitor C1) are applied to a shaping stage comprising for example an amplifier A, a bandpass filter F and a comparator U1. The amplifier can have for example a gain of 100.

Figure 3:
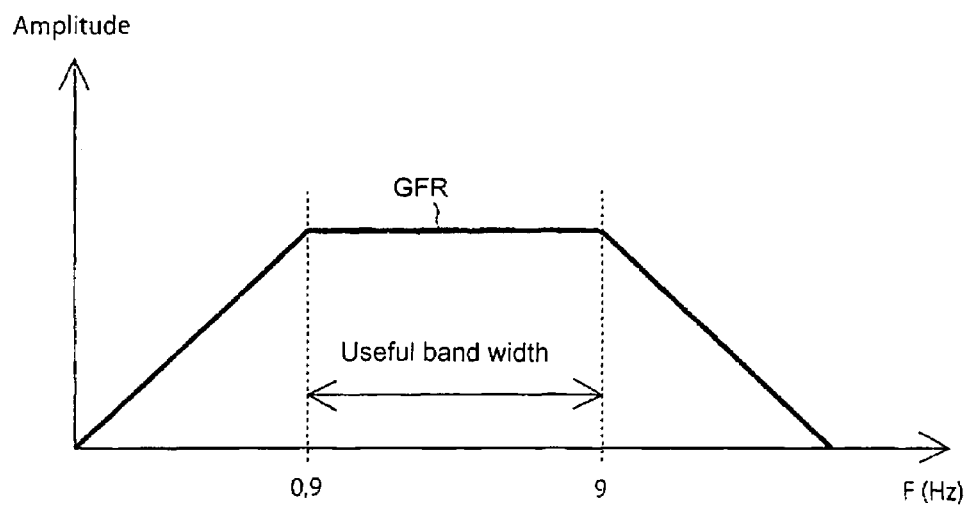
FIG. 3 depicts the global frequency behavior of part of the circuit depicted in FIG. 2.

As can be clearly seen in FIG. 3, which depicts the frequency behavior of all of the elements that have just been described, the global frequency response GFR of the association of the inductor L1, the low-pass filter F1 and the shaping stage is situated principally between 0.9 Hz and 9 Hz, which constitutes the characteristic frequency range of the signals to be measured. (These frequencies correspond, for a heavy vehicle, to speeds of between approximately 10 km/h and 100 km/h.)

It is also remarked that this global frequency response GFR is essentially flat over this frequency range, which greatly simplifies the subsequent processing of the signals generated as an output.

The signals amplified by the amplifier A and transmitted by the bandpass filter F are applied to the comparator U1, which fulfils a function of detecting the half cycles of the signal generated by the coil 2 because of its rotations in the earth's magnetic field, after processing as described above. This comparator U1 thus generates counting pulses, matching each of the half cycles of the signal generated by the coil 2, which are transmitted to the counter 8.

The circuit described above (and in particular the amplifier A) makes it possible to generate at the output of the bandpass filter F1 a signal that allows triggering of the comparator; the latter then delivers a logic signal, for example with an amplitude of 3 V, compatible with digital circuits.

The terminals of the coil 2 (represented on the circuit in FIG. 2 by the inductor L1) are connected for a second part by means of a capacitor C2 (for example of 100 pF) which reduces the resonant frequency of the coil 2 (which has a natural resonant frequency of around 100 kHz as seen above) to approximately 50 kHz. The use of the capacitor C2 also makes it possible to stabilize the resonant frequency of the whole to this value of 50 kHz, the stray capacitance of the coil 2 (of approximately 40 pF as seen above) not making it possible in practice to obtain a sufficiently stable value of the resonant frequency.

The signal at the terminals of the assembly consisting of inductor L1 and capacitor C2 is transmitted to a transistor T by means of a capacitor C3, which makes it possible to allow to pass in the direction of the transistor T only the signals at frequencies above a given value. Thus the capacitor C3 forms a high-pass filter with a cutoff frequency here below 50 kHz and which forms the HF filter in FIG. 1.

Thus, when the peak amplitude of the high-frequency signals (here at 50 kHz) at the terminals of the coil exceeds 0.6 V (by virtue of the amplification generated naturally by the resonance of the assembly at this frequency), the transistor T becomes conductive and its emitter-collector voltage changes from 3 V to 0 V, which constitutes alert information transmitted to the microcontroller 10.

The counting device is supplied by an electric battery, for example a battery delivering a voltage VCC of 3 V available under the reference BR1632A.

A description will now be given with reference to FIG. 4 of various conceivable phases of the functioning of the counting device mentioned above during which it dialogues with an external device as already mentioned.

Figure 4:
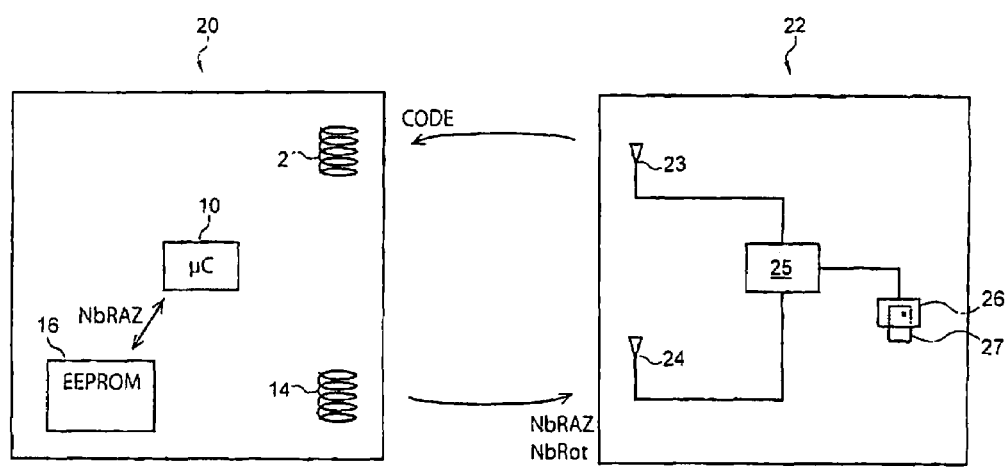
FIG. 4 depicts 4 depicts the device of FIG. 1 and a monitoring device able to communicate with it.

The device for counting the number of rotations is depicted in general terms in FIG. 4 under the reference 20. Some of the elements that make it up (namely the coil 2, the microcontroller 10, the transmission antenna 14 and the non-volatile memory 16) are also depicted schematically in FIG. 4 in order to not to overburden this figure. Reference can naturally be made to the previous figures (in particular FIG. 1) for a detailed description of the constitution of the counting device 20.

As already mentioned, the counting device 20 can dialogue with an external device 22 (here a tire use monitoring device, which can be implemented in practice in the form of a dedicated connector or terminal or in the form of a device installed in the vehicle).

The external device 22 comprises means (typically an antenna) 23 for transmitting an electromagnetic signal intended for the counting device 20 (and precisely the coil 2 in this device). The external device 22 also comprises means (of the antenna device) 24 for receiving the data transmitted by the counting device 20 by means of its transmission antenna 14.

The external device 22 acts for example under the general control of a microprocessor 25. According to one possibility of an embodiment used as explained hereinafter, the external device 22 can also include a microcircuit card reader 26 connected to the microprocessor 25 and able to read data stored on a microcircuit card 27.

Various possible phases of the functioning of the counting device 20 will now be described by way of example.

Immediately after its production and before any dialogue with an external device 22, the counting device 20 is for example initialized as follows: number of zeroings in the life of the device NbRAZ (stored in non-volatile memory 16): 0; number of rotations counted NbRot (stored in the registers of the microcontroller): 0.

The counting device can then undergo displacements and movements, for example during any transportation thereof before its use, which possibly causes risks of counting (and therefore incrementation) of the number of rotations counted NbRot without matching any actual wear on the system being monitored.

It is therefore desirable to zero this counting before the first effective use of the appliance being monitored, according to an authorized zeroing procedure.

Such an authorized zeroing procedure is for example a conditional procedure that is implemented when at least one precise condition is fulfilled; here, two conditions must be fulfilled as already described, namely the presence of a predetermined voltage value on a terminal 18 of the microcontroller 10 of the counting device 20 and the reception of alert information generated by the external device 22.

During such an authorized zeroing procedure (performed for example by an authorized person who knows the procedure to be applied and possesses a dedicated microcircuit card 27), the external device 22 transmits not only the alert information (which under the aforementioned conditions triggers the authorized zeroing of the counting device 20), but also a CODE number read for example on the microcircuit card by means of the card reader 26 and thus transmitted on the instruction of the microprocessor 25 by the transmission means 23. When this CODE number is received during the authorized zeroing stage, the microcontroller 10 of the counting device 20 stores this CODE number in its internal registers (or random access memory).

Moreover, the microcontroller 10 then increments the value of the number of zeroings NbRAZ stored in non-volatile memory 16.

The counting device 20 can then commence its normal function, namely principally counting the number of rotations and storing information NbRot representing this number.

At a subsequent operating phase, the external device 22 may wish (in general at the request of an operator) to take cognizance of the number counted in the counting device 20 according to the methods already explained with regard to FIG. 1.

To do this, the external device 22 sends, by mean of its transmission means 23, alert information and the CODE number already sent when the counting device 20 was zeroed (that is to say in practice the number stored in the microcircuit card associated with the counting device 20).

On reception of the alert information, the microcontroller 10 verifies first of all the identity of the number that it has just received in association with the alert number with the number stored during the authorized zeroing phase, in order to detect any loss of data in its internal registers.

In the case of a difference between the number received and the number stored, it is considered that the internal registers have been corrupted (whether this be because of a fraudster or fortuitously); the information relating to the number of rotations counted is then doubtful and will not be transmitted: in this case the transmitter 12 is not activated.

If on the contrary the number received with the alert information corresponds precisely to the number stored during the authorized zeroing, the information indicating the number of rotations NbRot and the number of zeroings undergone by the counting device NbRAZ is sent to the external device 22 by means of the transmitter 12 and its transmitter 14.

The external device 22 can then verify that the counting device has undergone one and only one zeroing, which confers a character of reliability on the information indicating the number of rotations already received.

In a variant, the verification that one and only one zeroing of the counting device 20 has been performed can be implemented within the counting device; it is then possible here also to prevent the sending of the information indicating the number of rotations if such a verification is not positive.

Figure 5:
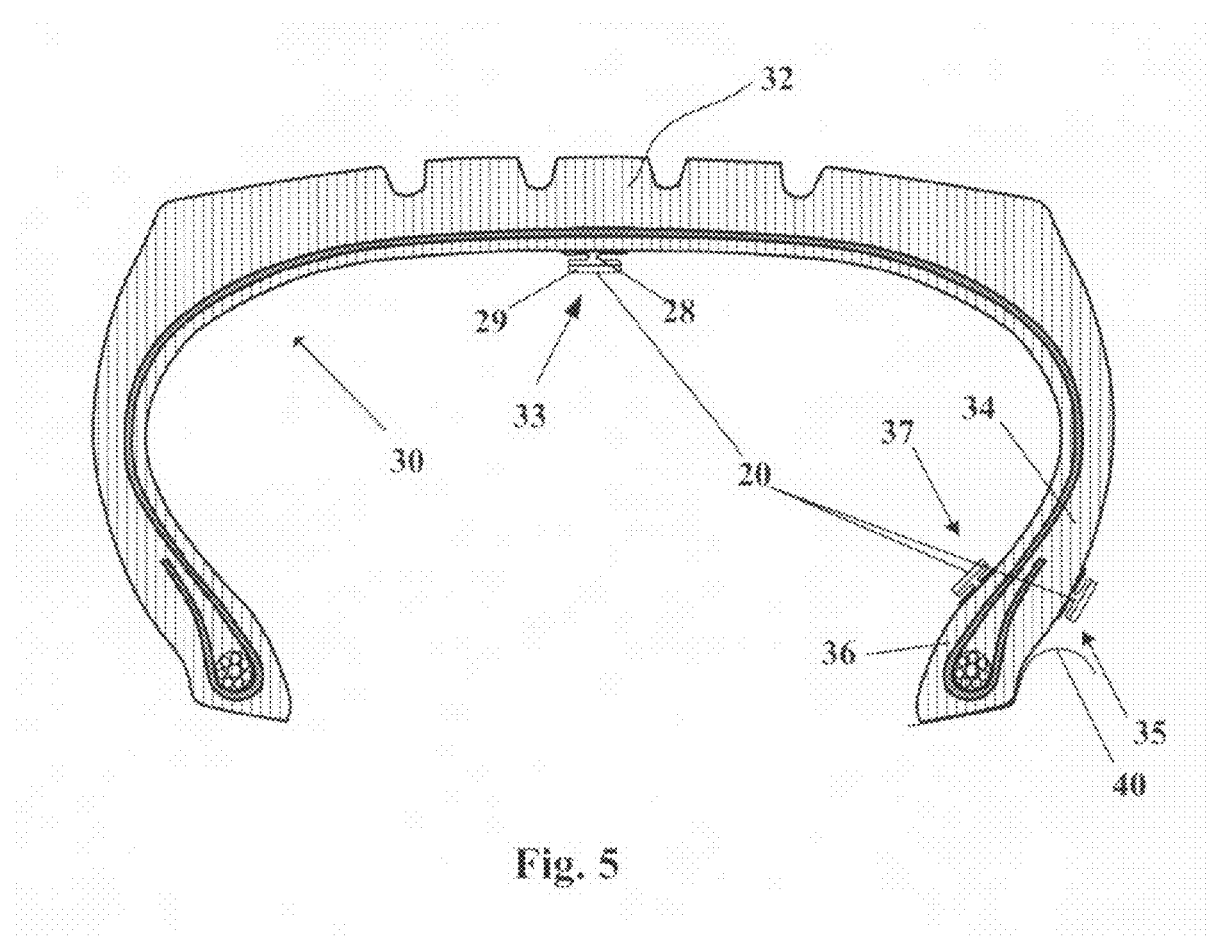
FIG. 5 is a view in meridian section of a tire provided, illustratively, with several rotation counting devices disposed on its internal and external surfaces.

FIG. 5 is a view in meridian section of a tire 30 mounted on a rim 40. The tire 30 comprises a crown 32, sidewalls 34 and two beads 36. The beads 36 rest on the hooks 40 of a rim (only one hook of the rim is shown). The devices 20 can in particular be disposed at the three positions illustrated in FIG. 5: on the internal rubber of the tire between the bead 36 and the sidewall 34 (position 37); under the crown 32 (position 33) and outside the tire at the sidewall 34 (position 35).

The devices 20 are, by way of example, fixed to the surface of the tire by means of a rubber patch 28 in the general shape of a mushroom and whose surface is bonded to the surface of the tire. The housings 29 of the devices 20 are bonded to the external surface of the rubber patch. The shape of the mushroom protects the devices from stresses and deformations undergone by this surface of the tire.

The embodiment that has just been described, and in particular the numerical values indicated, constituted only one possible example of an implementation of the invention.

The invention claimed is:

1. A tire, wheel or tire and wheel assembly configured to count a number of rotations, the tire, wheel or tire and wheel assembly comprising:
   a storage means for containing counting information (NbRot) representing a number of rotations counted at each moment, and
   means for ensuring absence of zeroing of the storage means from a predetermined time so that the counting information (NbRot) represents the number of rotations counted from the predetermined time.

2. The tire, wheel or assembly according to claim 1, in which the means for ensuring the absence of zeroing comprise means of conditional zeroing of the storage means.

3. The tire, wheel or assembly according to claim 2, further comprising means of receiving a request to send data transmitted by an external device able to communicate with the tire, wheel or tire and wheel assembly, a request intended to produce a zeroing of the tire, wheel or tire and wheel assembly is encrypted, and an encrypting key is placed in the external device.

4. The tire, wheel or assembly according to claim 2, in which said conditional zeroing means are able to zero the storage means if and only if at least two distinct conditions are fulfilled.

5. The tire, wheel or assembly according to claim 4, further comprising means for receiving a request to send data, wherein a first one of the conditions consists of reception of the request.

6. The tire, wheel or assembly according to claim 5, further comprising a microcircuit, wherein a second one of the conditions consists of a predetermined voltage on a pin of the microcircuit.

7. The tire, wheel or assembly according to claim 2, in which the means for ensuring the absence of zeroing comprise means of counting a number of zeroings (NbRAZ) of the storage means.

8. The tire, wheel or assembly according to claim 7, in which the counting means are able to store the number of zeroings (NbRAZ) in a non-volatile memory.

9. The tire, wheel or assembly according to claim 7, in which the counting means comprise at least one fusible component operable to be blown at a time of a zeroing.

10. The tire, wheel or assembly according to claim 9, in which the tire, wheel or tire and wheel assembly is disabled when a last fusible component is blown.

11. The tire, wheel or assembly according to claim 7, further comprising data transmission means, wherein the transmission means are able to transmit information (NbRAZ) relating to the number of zeroings.

12. The tire, wheel or assembly according to claim 2, further comprising means for initializing the tire, wheel or tire and wheel assembly to zero the storage means at the predetermined time.

13. The tire, wheel or assembly according to claim 12, in which the initialization means are able to store a predetermined code (CODE) in a first part of a random access memory.

14. The tire, wheel or assembly according to claim 13, in which a second part of the random access memory forms the storage means.

15. The tire, wheel or assembly according to claim 14, in which the means for ensuring the absence of zeroing comprise means for verifying a presence of the predetermined code in the first part of the random access memory.

16. The tire, wheel or assembly according to claim 15, further comprising means for transmitting the counting information, said transmitting means are able to send the counting information only in case of positive verification by the verification means.

17. A method for equipping and characterizing a tire, wheel or tire and wheel assembly to count a number of rotations of an object in a reference frame, in which a storage means holds counting information (NbRot) representing a number of rotations counted at each moment, and means for ensuring absence of zeroing of the storage means from a predetermined time so that the counting information (NbRot) represents the number of rotations counted since the predetermined time.

* * * * *